No. 723,181. PATENTED MAR. 17, 1903.
C. W. RAYMOND & D. BROWN.
BRICK CUTTING MACHINE.
APPLICATION FILED NOV. 11, 1902.
NO MODEL. 4 SHEETS—SHEET 1.
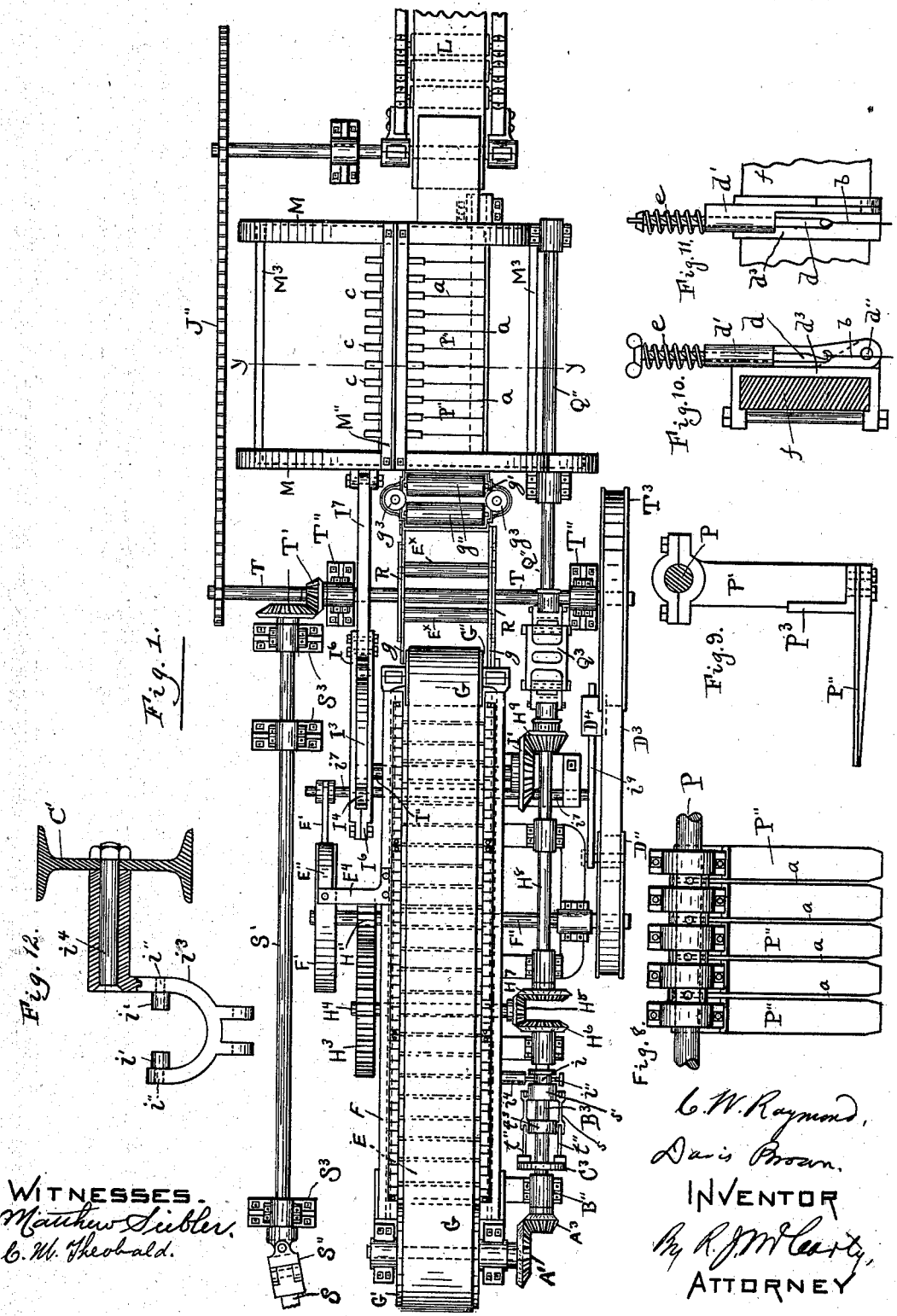

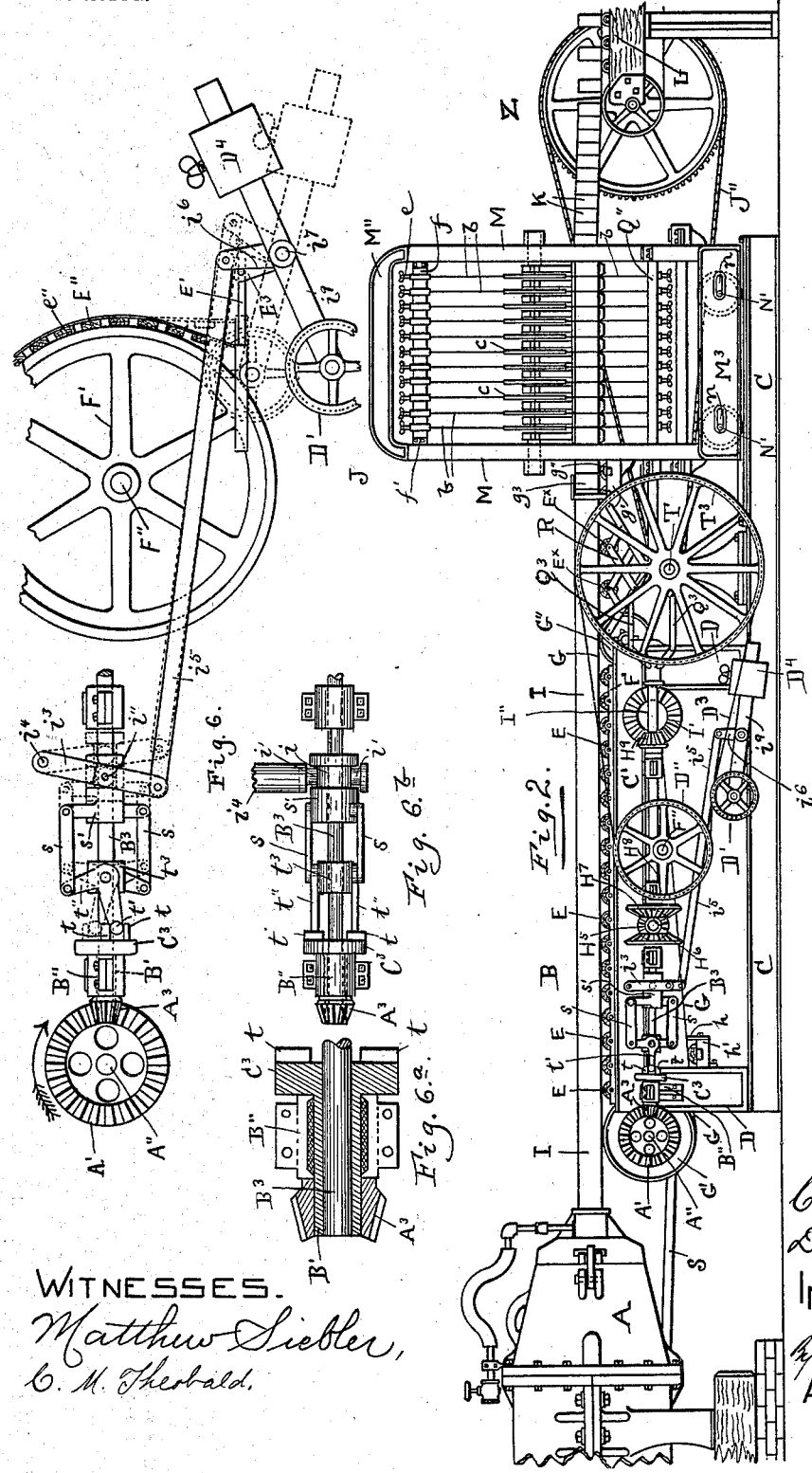

No. 723,181. PATENTED MAR. 17, 1903.
C. W. RAYMOND & D. BROWN.
BRICK CUTTING MACHINE.
APPLICATION FILED NOV. 11, 1902.
NO MODEL. 4 SHEETS—SHEET 3.
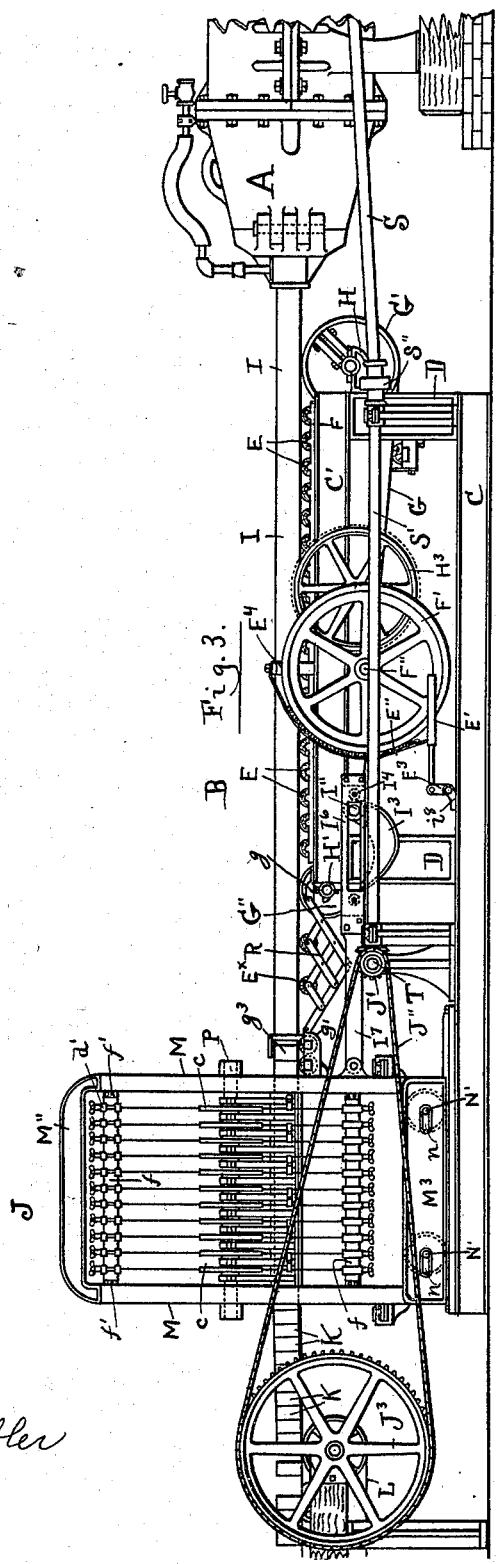
WITNESSES.
Matthew Siebler
C. M. Theobald.
C. W. Raymond.
Davis Brown.
INVENTOR
By R. J. McCarty,
ATTORNEY No. 723,181. PATENTED MAR. 17, 1903.
C. W. RAYMOND & D. BROWN.
BRICK CUTTING MACHINE.
APPLICATION FILED NOV. 11, 1902.
NO MODEL. 4 SHEETS—SHEET 4.
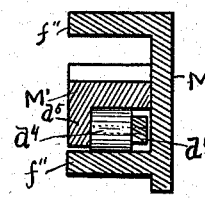
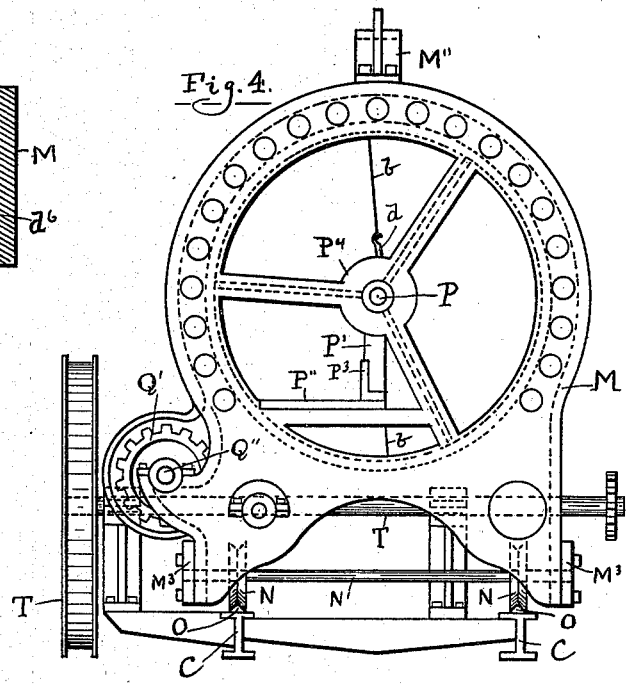
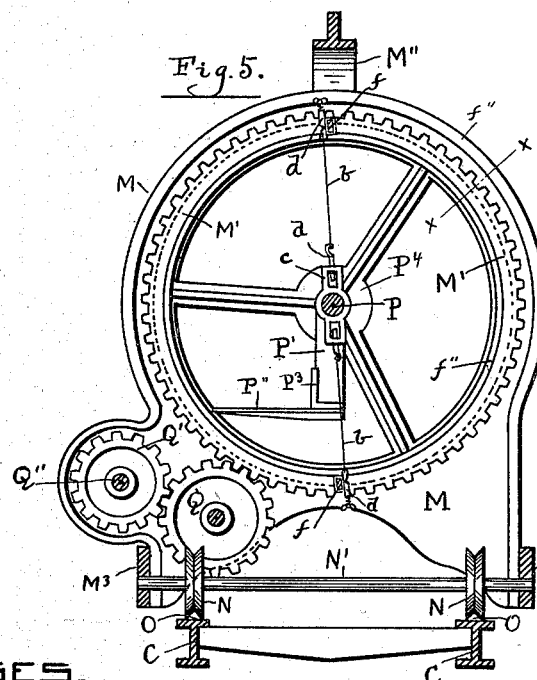

UNITED STATES PATENT OFFICE.

CHARLES W. RAYMOND, OF DAYTON, OHIO, AND DAVIS BROWN, OF CHICAGO, ILLINOIS.

BRICK-CUTTING MACHINE.

SPECIFICATION forming part of Letters Patent No. 723,181, dated March 17, 1903.

Application filed November 11, 1902. Serial No. 130,866. (No model.)

*To all whom it may concern:*

Be it known that we, CHARLES W. RAYMOND, residing at Dayton, in the county of Montgomery and State of Ohio, and DAVIS BROWN, residing at Chicago, in the county of Cook and State of Illinois, citizens of the United States, have invented certain new and useful Improvements in Brick-Cutting Machines; and we do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to improvements in brick-cutting machines.

The object of the invention is to produce a machine with a greatly-increased capacity for cutting bricks.

The invention comprises a cutting-reel having horizontal and rotary movements and adapted to cut a series of bricks from a continuously-moving clay column or bar. The horizontal movement, during which the series of brick are cut, is given said cutting-reel by the moving clay bar. The rotary movement is imparted to said reel by suitable power, which also reverses the horizontal movement of said reel after each cutting operation and resets said reel for the next succeeding operation.

The invention also comprises governing mechanism controlled by the force of the moving clay bar and by means of which the speeds of the cutting-reel and the moving clay bar are maintained in operative relation, so that any danger of severing or breaking the continuously-advancing clay bar is obviated, and the machine is enabled to operate successfully. An automatic brake is operated through said governing mechanism for checking the power for rotating and resetting the cutting-reel when the speed assumes an inoperative relation with the speed of the moving clay bar, and the invention comprises other features and details hereinafter described and claimed.

Preceding a detail description of our invention reference is made to the accompanying drawings, of which—

Figure 1 is a top plan view of a brick-cutting machine made in accordance with our invention. Figs. 2 and 3 are elevations of opposite sides of our improved brick-cutting machine. Fig. 4 is an end elevation thereof. Fig. 5 is a sectional view on the line $y\ y$ of Fig. 1. Fig. 6 is an enlarged detail view of the governing mechanism which controls the operating power introduced to the brick-cutting mechanism. Fig. 6$^a$ is an enlarged sectional view of a portion of the governing devices. Fig. 6$^b$ is a top plan view of the governing devices as shown in Fig. 6 with the brake mechanism removed. Fig. 7 is a sectional view on the line $x\ x$ of Fig. 5. Fig. 8 is a detail top plan view of a portion of the sections or plates forming the platen. Fig. 9 is an end elevation of Fig. 8. Figs. 10 and 11 are detail views of the devices by means of which the outer ends of the cutting-wires are secured in position. Fig. 12 is a detail portion of the governing devices.

In a detail description of the invention similar reference characters indicate corresponding parts.

A designates the nozzle end of a well-known brick-machine, from which a body of clay is forced by means of a screw or auger (not shown) in a continuous bar I onto the feed-table B and thence to the cutting-reel J. The feed-table is constructed as follows:

C and C' are upper and lower I-beams which are connected to four upright standards D.

E designates a series of rollers which are journaled in frames F, secured to the upper I-beams C'.

G' and G'' are pulleys which are journaled in bearings H and H' on two of the standards D and over which a continuous belt G passes, said belt passing over the series of rollers E. The bar of clay I enters the belt G at said pulley G' and advances to the cutting-reel J, where a series of bricks K are cut and delivered to an off-carrier L at the delivery end Z of the machine.

The cutting-reel consists of two open side frames M M, having lateral flanges $f'''$, between which are supported two ring-gears M' M'. These frames are tied together by an upper bar M'' and two lower bars or castings M³. The platen upon which the clay bar I moves lies between the two side plates M M and consists of a horizontal portion made up of a series of sections P'', (shown more clearly in Fig. 8,) which have a series of intervening spaces $a$ and a series of rear vertical walls P³, which join the bottom or horizontal portions P''. The rear walls P³ are integral parts of a series of hangers or depending arms P', which are rigidly clamped to a horizontal shaft P, that lies between the centers of the frames M M and is fixed to the hubs P⁴ thereof. The bottom sections P'' of the platen are bolted to the arms P', as shown in Fig. 9. The sections forming said platen are of uniform size, and each is substantially the size of the brick required. The openings $a$ between each of said plates or sections are provided for the passage of the wire cutters $b$, of which there is one in each set of wires in excess of the number of bricks that are cut upon the platen. The number of such wire cutters $b$ depend upon the size of the brick to be cut, as do also the number of the sections of the platen. The said wire cutters $b$ are in two sets, placed in diametrically opposite positions. The wires of each set are fastened near the center of the reel by a series of clamps $c$, which are fixed to the shaft P and rotate therewith in the movement of the reel. The outer ends of said wire cutters are fastened to a series of hooks $d$, that are passed through openings in supports $d'$, hinged at $d''$ to brackets $d^3$, which are connected to bars $f$, said bars being connected at each end $f'$ to the ring-gears M'. The hooks $d$ are held by a series of spiral springs $e$. (See Figs. 10 and 11.) The ring-gears M' M' turn and are supported upon rollers $d^4$, which run on the lower flanges $f''$ of the side frames M. (See Fig. 7.) The rollers $d^4$ are inclosed at their outer ends by the flanges $d^5$ of the ring-gears and are supported on pins which are fixed in rings $d^6$, which lie between the flanges of the side frames M.

The above-described mechanism comprises, as before stated, the cutting-reel, which is given a continuous rotary motion through pinions Q, that mesh with the ring-gears. The pinions Q are on a shaft which is mounted in the frames M M and are driven by a gear Q' on shaft Q'', also mounted in said frames. The shaft Q'' is connected to a shaft H⁸ by a flexible coupling Q³, which permits the reel to have horizontal movement. The reel is supported and is movable on rollers N, which are fast on shafts N', that are loose in the lower tie-bars M³, said tie-bars having slots $n$, in which the ends of said shafts lie. The rollers N run on slightly-inclined V-shaped tracks which are secured to the lower I-beam C. As the cutting-reel moves away from the feed-table B on said slightly-inclining tracks O the gap formed by said movement between the feed-table and the reel is filled or occupied by a pair of lazy-tongs R, which support two rollers E<sup>×</sup> on a plane with the rollers E and receive the clay bar I as said bars move off the belt G. The lazy-tongs referred to provide a support for the clay bar to enter the reel and permits the reel to have the necessary horizontal movement from and toward the feed-table. The lazy-tongs on each side are secured at one end to arms $g$, fastened to the upper I-beams C', and the other ends of said lazy-tongs are fastened to an oil-pan $g'$, which is fixed to the adjacent reel-frame M. The oil-pan $g'$ supports two horizontal rollers $g''$, which oil the bottom of the clay bar I to permit it to easily pass onto the platen, and the said oil-pan also contains two vertical rollers $g^3$, which oil the opposite sides of the clay bar in passing into the reel.

The rotating belt G is kept clean by a scraper $h$, fastened to a casting $h'$, secured to adjacent standard D.

S designates the main power-shaft, through which power is conveyed to impart the rotary and resetting movements of the reel. This shaft is connected to a shaft S' by a universal coupling S'', shaft S' being supported in bearings S³, fastened to the lower I-beam C on one side of the machine. From shaft S' power is transmitted to a cross-shaft T through bevel-gears T', said shaft T being supported in bearings T''. This shaft T has fixed to it a pulley T³. The power introduced to the pulley T³ is transmitted through the governing devices to the shaft H⁸, from which the cutting-reel receives its continuous rotary motion, and from shaft H⁸ to shaft I'', through which the resetting movement is imparted to said reel.

The governing mechanism through which the power is regulated is shown in Figs. 6, 6ª, and 6ᵇ and consists of the following mechanism: A' is a bevel-gear keyed to a shaft A'', upon which is clamped the pulley G'. As the clay bar I moves forward on belt G over and onto the pulley G' said gear A' is rotated and meshing with bevel-pinion A³, which is keyed to a sleeve B', rotates said bevel-pinion. The sleeve B' turns loosely in a box B'', through which the shaft B³ passes, said box B'' being fastened to a standard D. On the exposed end of the sleeve B' is a disk C³, which has four lugs $t$, arranged at opposite points. Between each two of said lugs $t$ is placed the ball end $t'$ of two bell-crank levers $t''$, the fulcrums of which are on a sleeve $t^3$, keyed to the shaft B³. On the other arm of said bell-crank levers are fastened links $s$, said links being also fixed to a sleeve $s'$. The sleeve $s'$ has an annular groove $i$, in which rollers $i'$ run, said rollers being supported on pins $i''$, fixed to a swinging arm $i^3$. (See Figs. 6, 6ᵇ, and 12.) The arm $i^3$ is pivoted to a pin $i^4$, which is fixed to one of the I-beams C'. To the lower end of said arm $i^3$ is connected an arm $i^5$, the other end of which is attached to an arm $i^6$, which is connected to a shaft $i^7$.

This latter shaft has a rocking movement on bearing $i^8$. (See Fig. 3.) To shaft $i^7$ there is keyed an arm $i^9$, one end of which supports the flanged idler D', over which a loose belt $D^3$ passes, said belt also passing over pulleys $T^3$ and D''. To the other end of the arm $i^9$ is secured an adjustable weight $D^4$ to balance the idler D'. To the shaft $i^7$ is further keyed an arm $E^3$, to one end of which is swung an arm E', that has attached to it a friction-brake E''. This brake is connected to an arm $E^4$, fastened to one of the upper I-beams C'. To shaft F''' is keyed a spur-pinion H'', meshing with a spur-gear $H^3$ on shaft $H^4$. To the other end of shaft $H^4$ is keyed a bevel-pinion $H^5$, meshing with bevel-gear $H^6$, the latter gear being keyed to shaft $B^3$. Pinion $H^5$ also meshes with a bevel-gear $H^7$, keyed to shaft $H^8$, said shaft being connected to the flexible coupling $Q^3$, which unites the shafts $H^8$ and Q'', the latter shaft, as before stated, driving the reel-gearing. (See Fig. 5.) On shaft $H^8$ is also keyed a bevel-pinion $H^9$, meshing with bevel-gear I', keyed to shaft I''. On this shaft I'' is also keyed a cam $I^3$, which imparts to the cutting-reel its reversed or resetting movement. This cam $I^3$ works against a roller $I^4$, turning on a pin secured in housing $I^6$, supported on shaft I''. The housing is fastened to the adjacent side frame M by arm $I^7$. (See Fig. 1.) The shaft T carries a sprocket-wheel J', over which runs a chain belt J'', that passes over a larger sprocket-wheel $J^3$, driving the off-carrier L.

Having described the invention, we will now proceed to outline the operation thereof. The power coming into the machine through the shaft S' is carried to pulley $T^3$ by shaft T and from there transmitted to shaft $H^8$ through gears H'', $H^3$, $H^5$, and $H^7$. From shaft $H^8$ it is transmitted to cam $I^3$ on shaft I''. The power thus introduced is regulated in its transmission to shaft $H^8$ by the force or power generated by the moving clay bar I. The clay bar moving forwardly engages the belt G, which is moved forward therewith at the same speed. As said belt runs on pulleys G' and G'' the gear A' is also rotated and in turn drives the pinion $A^3$, and thereby causes the sleeve $C^3$ to turn on the shaft $B^3$. As the sleeve $C^3$ rotates it moves the bell-crank levers t'' of the governing devices, and sleeve s' is likewise moved forward through links s s on the shaft $B^3$. As the said sleeve moves forward the idler D' is raised through connections $i^3$ and $i^5$ to tighten the loose belt $D^3$, thereby causing the power to be transmitted from pulley $T^3$ to pulley D''. As pulley D'' moves the mechanism of the entire table is started. Assuming the cutting-reel to be reset, or in that position closest to the feed-table, the advancing clay bar I entering the platen P'' will move the reel horizontally in the direction in which said clay bar is moving. While the reel is thus being moved, it is also being rotated by the gearing Q and Q', which are driven constantly through the shaft Q''. In this rotation of said reel one set of the cutting-wires b passes through the clay bar I, lying on the platen. In the initial starting of the machine the clay bar does not occupy all of the platen P'' before the force of said clay bar transmits the horizontal movement to the reel. Therefore in the first or initial cut of the reel a full series of bricks are not cut; but in each succeeding operation the length of the platen is occupied each time by the clay bar and a full series of bricks are cut. As soon as the first set of wires b coming into operation has cut through the clay bar the reel is given its reversed horizontal or resetting movement by the cam $I^3$ engaging the roller $I^4$. During this resetting movement of the reel the clay bar in its continuous movement advances onto the platen P'', and when the said reel has reached the limit of its resetting movement the said clay bar has moved entirely across the platen, and the reel is moved thereby to its outer horizontal position. The reel, as shown in Figs. 1, 2, and 3, is at the limit of such outer horizontal position. This will be readily apparent from the expanded position of the expanding and contracting support R. It will be borne in mind that the clay bar I in filling the platen P'' for each succeeding operation is not required to move the full length of the platen. The reel moving in the opposite direction in its resetting movement compensates for approximately one-half the length of said platen, so that when said reel has reached the limit of its resetting movement under the cam $I^3$ the clay bar occupies the full length of the platen, or approximately so. Two series of bricks are cut in one revolution of the cutting-reel, and it will be understood the reel is reset by the cam $I^3$ for each series. In case the power should run faster than the clay bar I is moving, and thereby create a liability of the same being broken or divided by the belt G, the shaft $B^3$ at such time is turned more rapidly than the sleeve B'. The result is the governing devices are reversed. This draws the sleeve s' in a reversed direction, or that position shown in full lines, (see Fig. 6,) which throws the idler D' away from the loose belt $E^3$ and at the same time throws forward the arm $E^3$ and applies the brake E'' to the fly-wheel F', thus checking the speed of the machine. When there is an equilibrium established between the speed of the power coming into the machine through shaft T and the speed of the moving clay bar I, the governing devices are idle.

Having described our invention, we claim—

1. In a brick-cutting machine, a feed-table, and a cutting-reel having a continuous rotary motion and adapted to cut a series of bricks at a time from a clay bar advanced thereto by said feed-table.

2. In a brick-cutting machine, a feed-table, a cutting-reel having a continuous rotary motion and adapted to cut a series of brick at a time from a clay bar advanced thereto by said feed-table, and governing mechanism controlled by the force of the moving clay bar and regulating the speed of said reel.

3. In a brick-cutting machine, a feed-table, a cutting-reel having a continuous rotary motion and adapted to cut a series of brick from a clay bar advanced thereto, a governing device controlled by the moving clay bar, and brake mechanism controlled by said governing device and adapted to check the power required for rotating and resetting the cutting-reel when said power becomes greater in point of speed than the speed of the moving clay bar.

4. In a brick-cutting machine, a rotary cutting-reel having a continuous rotary movement and adapted to cut a series of brick at a time, a feed-table over which the clay bar is advanced from which said series of bricks are cut, the said clay-bar imparting to the reel a horizontal movement in one direction during the cutting operation, and means for resetting said reel in its former operative position from which it is again movable by the advancing clay bar.

5. In a brick-cutting machine, a cutting-reel having a continuous rotary motion and adapted to cut a series of brick from a moving clay bar, said clay bar imparting to said reel a horizontal movement during the cutting operation, and means for resetting the cutting-reel after the operation of cutting each series of brick.

6. In a brick-cutting machine, a cutting-reel having a continuous rotary motion and adapted to cut a series of brick from an advancing clay bar, said clay bar imparting to the reel a horizontal motion during which said series of brick are cut, a feed-table over which said clay bar is advanced, and means for resetting the cutting-reel after each operation of cutting a series of brick.

7. In a brick-cutting machine, a cutting-reel having a continuous rotary motion and adapted to cut a series of brick from an advancing clay bar, a feed-table over which said clay bar is advanced to said cutting-reel, devices for resetting said cutting-reel to a position to receive the clay bar after the cutting of each series of brick, means for imparting to said reel its continuous rotary motion, and governing devices controlled by the force of the moving clay bar and whereby the power transmitted to the reel for rotating and resetting it, is regulated to conform to the speed of the moving clay bar.

8. In a brick-cutting machine, a cutting-reel having a continuous rotary motion and adapted to cut a series of brick from a clay bar, a feed-table over which said clay bar is advanced to said cutting-reel, means for resetting the reel while the clay bar is moving into said reel, means for imparting the continuous rotary motion to said reel, and governing mechanism actuated by the motion of the clay bar and whereby the rotary and resetting movements of the reel are regulated to accord with the movement of the advancing clay bar.

9. In a brick-cutting machine, a cutting-reel having a continuous rotary motion and adapted to cut a series of brick from a clay bar, said clay bar giving the reel its horizontal movement, a feed-table over which said clay bar is advanced to the cutting reel, means for imparting a reversed horizontal movement to said reel to reset it for each successive cutting operation, and a governing device controlled by the motion of the clay bar and by means of which the power for rotating and resetting the cutting-reel is regulated to conform to the speed of the moving clay bar.

10. In a brick-cutting machine, a continuously-rotating cutting-reel adapted to cut a series of bricks, a moving clay bar imparting to said reel a horizontal movement and from which bar said series of bricks are cut, a drum or pulley rotated by said moving clay bar, devices for resetting the reel after each series of bricks are cut, and governing devices controlled by the moving clay bar through said drum or pulley and through which the power transmitted to the cutting-reel to rotate and reset the same is regulated in conformity with the speed of the moving clay bar.

11. In a brick-cutting machine, a rotary cutting-reel adapted to cut a series of bricks from a moving clay bar, said clay bar imparting a longitudinal movement to the reel during which movement, the cutting operation is performed, an expanding and contracting support interposed between the feed-table and the reel and upon which the clay bar passes onto the cutting-reel, means for reversing the longitudinal movement of the reel to reset it after each operation of cutting a series of bricks, governing devices controlled by the force of the moving clay bar, and a brake controlled by said governing devices and adapted to check the speed of the mechanism for rotating and resetting the reel, whenever said speed is not in uniformity with the speed of the moving clay bar.

12. In a brick-cutting machine, a feed-table, having a horizontal reciprocating movement and a continuous rotary movement, the longitudinal movement of said cutting-reel in one direction being imparted to said reel by a moving clay bar and during which movement a series of bricks are cut at a time by said reel, and automatic means for resetting said reel after each cutting operation.

13. In a brick-cutting machine, a cutting-reel adapted to cut a series of bricks at a time from a moving clay bar, said cutting-reel having a continuous rotary movement and moving at right angles to said clay bar.

14. In a brick-cutting machine, a cutting-reel having a continuous rotary movement and adapted to cut a series of bricks from a clay bar advanced thereto, a feed-table upon which said clay bar is advanced, and an expanding and contracting support for said clay bar between said feed-table and said cutting-reel.

15. The combination with a brick-machine, of a feed-table, a reel revolving continuously in one direction and moving automatically toward and from the brick-machine, the said reel being provided with a series of cutters adapted to cut a series of bricks at one operation and during the continuous revolutions of said reel.

In testimony whereof we affix our signatures in presence of two witnesses.

CHARLES W. RAYMOND.
   DAVIS BROWN.

Witnesses to C. W. Raymond's signature:
 R. J. McCARTY,
 C. M. THEOBALD.

Witnesses to Davis Brown's signature:
 L. C. YOST,
 L. C. CHILDS.